United States Patent
Øen et al.

(10) Patent No.: US 10,145,351 B2
(45) Date of Patent: Dec. 4, 2018

(54) HEATING DEVICE FOR FLUID

(71) Applicant: DEFA AS, Nesbyen (NO)

(72) Inventors: Geir Kåre Øen, Nesbyen (NO); Pål Sandøy, Nesbyen (NO); Agnar Kopperud, Nesbyen (NO)

(73) Assignee: DEFA AS, Nesbyen (NO)

( * ) Notice: Subject to any disclaimer, the term of this patent is extended or adjusted under 35 U.S.C. 154(b) by 0 days.

(21) Appl. No.: 15/124,789

(22) PCT Filed: Jan. 16, 2015

(86) PCT No.: PCT/NO2015/050008
§ 371 (c)(1),
(2) Date: Sep. 9, 2016

(87) PCT Pub. No.: WO2015/137817
PCT Pub. Date: Sep. 17, 2015

(65) Prior Publication Data
US 2017/0016421 A1    Jan. 19, 2017

(30) Foreign Application Priority Data
Mar. 13, 2014  (NO) .................................. 20140327

(51) Int. Cl.
*F02N 19/10* (2010.01)
*F01P 11/20* (2006.01)
(Continued)

(52) U.S. Cl.
CPC ............. *F02N 19/10* (2013.01); *F01M 5/007* (2013.01); *F01P 11/20* (2013.01); *F24H 1/121* (2013.01);
(Continued)

(58) Field of Classification Search
CPC .... F24H 1/121; F24H 9/1827; F24H 2250/04; F24H 9/0015; F24H 1/009; F24H 3/0429;
(Continued)

(56) References Cited

U.S. PATENT DOCUMENTS 1,482,574 A    2/1924  Meyer
1,512,517 A    10/1924 Astrom
(Continued)

FOREIGN PATENT DOCUMENTS

CA    2 269 908       10/2000
DE    10024306 A1      7/2001
(Continued)

OTHER PUBLICATIONS

Norwegian Search Report dated Oct. 6, 2014, directed to NO Application No. 20140327; 2 pages.
(Continued)

*Primary Examiner* — Long T Tran
(74) *Attorney, Agent, or Firm* — Morrison & Foerster LLP

(57) ABSTRACT

A heating device for heating of a fluid, particularly in a vehicle or vessel, comprising at least one heating element in a housing with a house wall and a fluid inlet and a fluid outlet. The wall or a part of this or a part of the house wall is a heat conductor for conducting heat between the heating element and at least one of the fluid channels. At least one chamber is defined by the at least one wall and a portion of the housing wall, or by walls in pairs between the fluid channels. The heating element is mountable in the chamber, which has an opening towards the outside of the housing. The opening is not fluidly connected to the fluid channels. The heating element can be a PTC element.

20 Claims, 5 Drawing Sheets

(51) Int. Cl.
    *F24H 1/12*     (2006.01)
    *F24H 9/18*     (2006.01)
    *H05B 3/24*     (2006.01)
    *F24H 9/20*     (2006.01)
    *F01M 5/00*     (2006.01)
    *F01P 11/04*     (2006.01)

(52) U.S. Cl.
    CPC ......... *F24H 9/1827* (2013.01); *F24H 9/2028* (2013.01); *H05B 3/24* (2013.01); *F01M 2005/008* (2013.01); *F01P 11/04* (2013.01); *F01P 2037/02* (2013.01); *F01P 2070/04* (2013.01); *F24H 2250/04* (2013.01); *H05B 2203/02* (2013.01)

(58) Field of Classification Search
    CPC ...... F24H 9/1872; F24H 3/085; F24H 9/1818; F01P 2070/04; F02N 19/10; B60H 2001/00307; B60H 1/2221; B60H 2001/00128
    See application file for complete search history.

(56) References Cited

U.S. PATENT DOCUMENTS

| | | | |
|---|---|---|---|
| 3,626,148 A | 12/1971 | Woytowich | |
| 4,208,570 A | 6/1980 | Rynard | |
| 4,808,793 A * | 2/1989 | Hurko | F24H 1/102 392/480 |
| 5,243,953 A | 9/1993 | Fuchs | |
| 2004/0264951 A1 * | 12/2004 | Kuebler | B60S 1/488 392/485 |
| 2006/0236989 A1 | 10/2006 | Callahan | |
| 2008/0000889 A1 * | 1/2008 | Niederer | B60H 1/2221 219/205 |
| 2008/0099464 A1 | 5/2008 | Niederer et al. | |
| 2013/0161306 A1 * | 6/2013 | Bohlender | H05B 3/02 219/202 |
| 2014/0374408 A1 * | 12/2014 | Seewald | H05B 6/108 219/629 |
| 2014/0374409 A1 * | 12/2014 | Seewald | H05B 6/36 219/630 |

FOREIGN PATENT DOCUMENTS

| | | |
|---|---|---|
| EP | 0104673 A2 | 4/1984 |
| EP | 0899985 A1 | 3/1999 |
| EP | 1872986 A1 | 1/2008 |
| EP | 2 693 152 | 2/2014 |
| WO | 2008106971 A1 | 9/2008 |

OTHER PUBLICATIONS

Norwegian Search Report dated Aug. 20, 2015, directed to NO Application No. 20150415; 2 pages.

International Preliminary Report on Patentability received for PCT Patent Application No. PCT/NO2015/050008, dated Jun. 27, 2016, 14 pages.

International Search Report and Written Opinion received for PCT Patent Application No. PCT/NO2015/050008, dated Jun. 26, 2015, 10 pages.

* cited by examiner

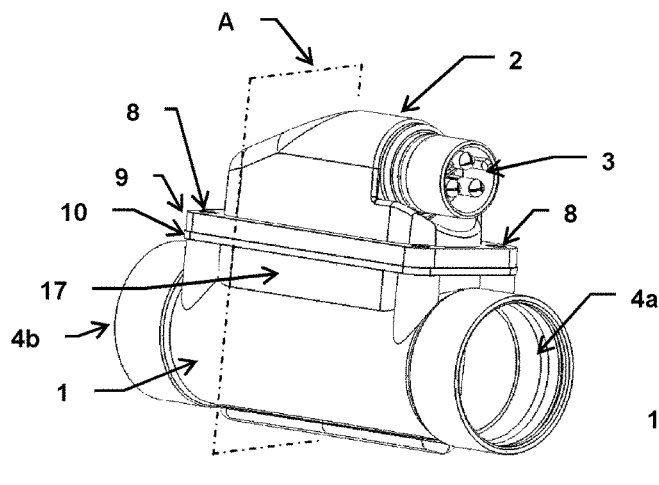
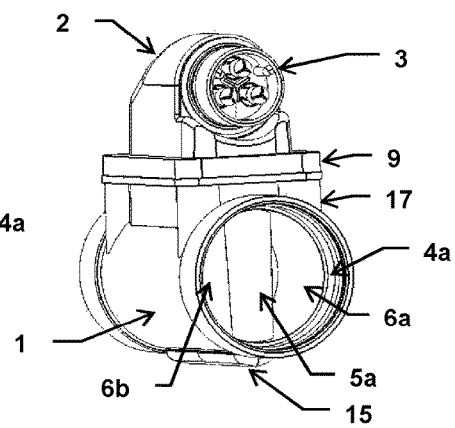
Fig. 1  Fig. 2
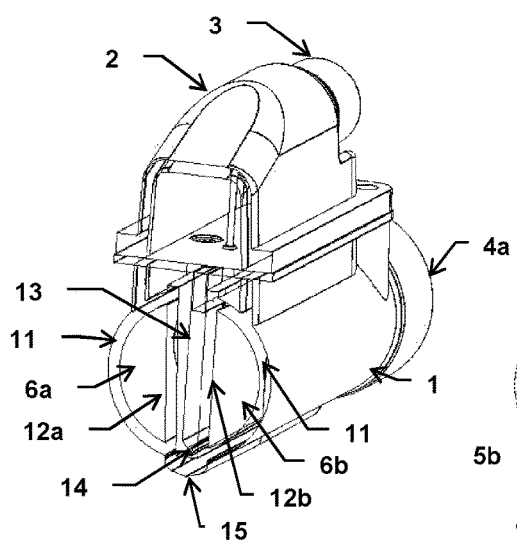
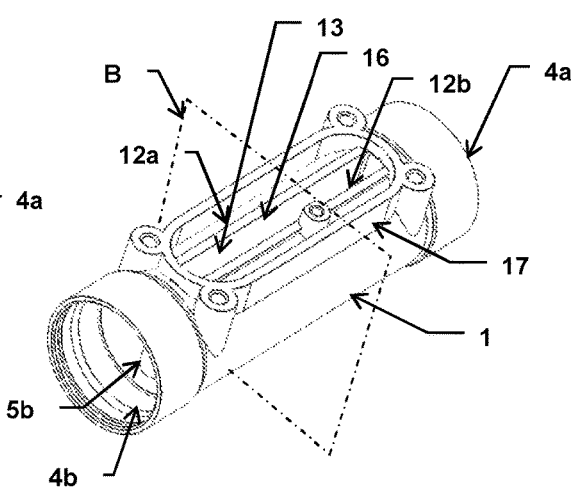
Fig. 3  Fig. 4

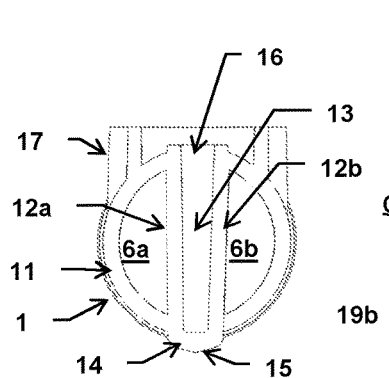
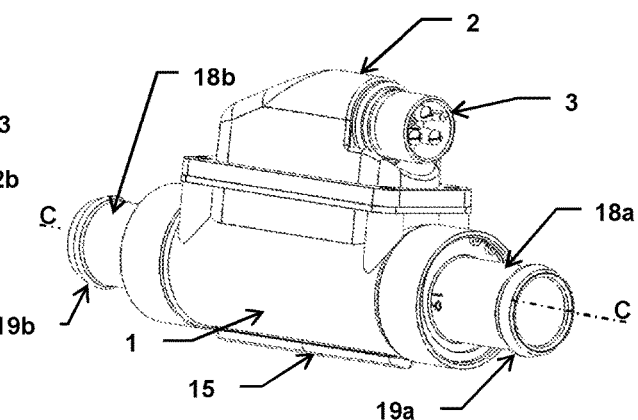
Fig. 5　　　Fig. 6
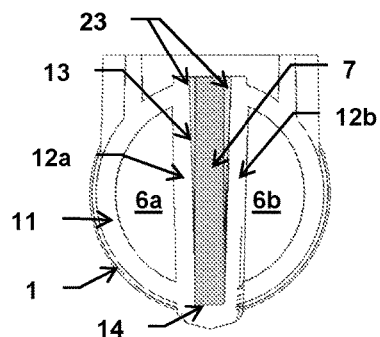
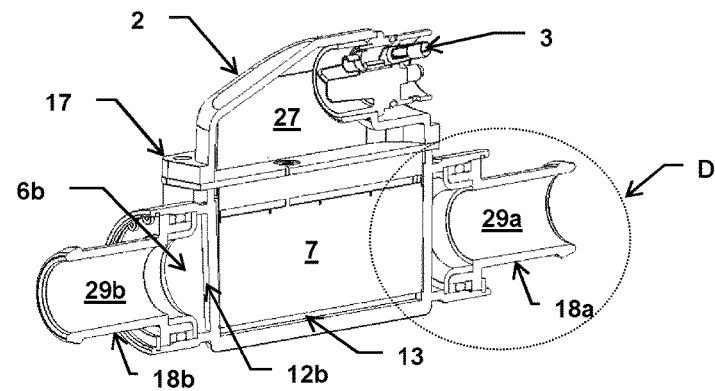
Fig. 7　　　Fig. 8
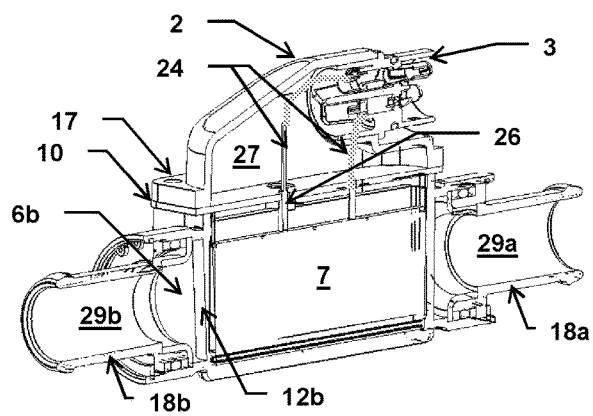
Fig. 9

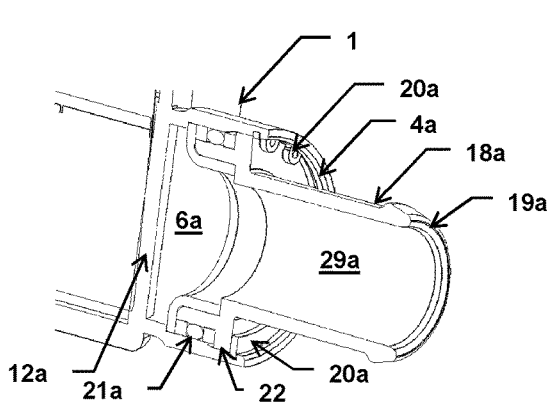
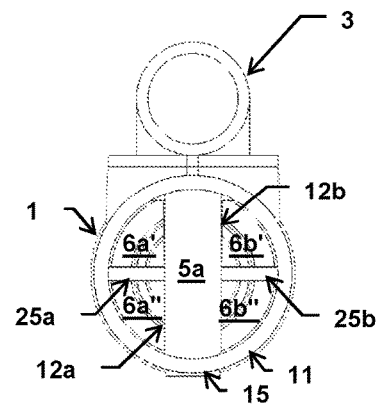
Fig. 10          Fig. 11
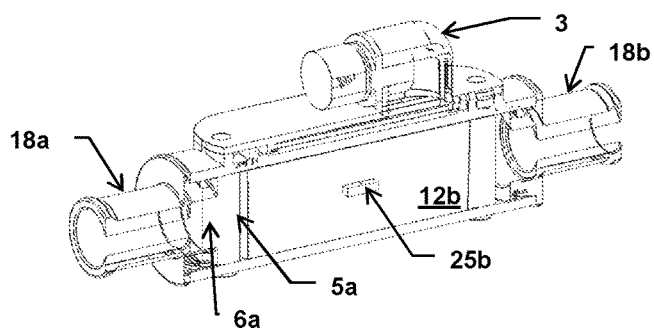
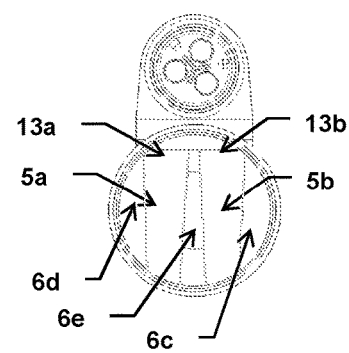
Fig. 12          Fig. 13
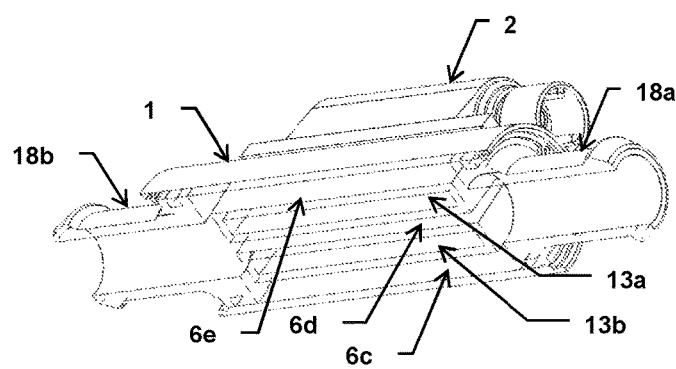
Fig. 14

HEATING DEVICE FOR FLUID

CROSS-REFERENCE TO RELATED APPLICATION

This application is a U.S. National Stage patent application of PCT/NO2015/050008 filed on Jan. 16, 2015, which claims priority to NO 20140327, filed Mar. 13, 2014, the entire contents of which are incorporated herein by reference.

FIELD OF THE INVENTION

The invention concerns heating devices, particularly for heating a fluid in a vehicle or vessel, as set out by the preambles of claims 1 and 23.

BACKGROUND OF THE INVENTION

Heating devices for engines for different types of vehicles or vessels are well known. The purpose of these is to preheat the engine by a direct or indirect heating of the engine oil or coolant, such that it easily starts in cold weather, and will reduce the fuel consumption/exhaust related to cold-starting the engine. Corresponding heating devices for other mechanical units in a vehicle or vessel, such as gearbox, hydraulics system, transmission system, are also known. For the sake of simplicity, the term "engine heater" will mainly be used in the following, even though these can also be used for heating other components.

There are different types of engine heaters, inter alia those that heat the engine coolant. A variant of such engine heaters comprises a container having a heating element. The container has an inlet opening and an outlet opening such that the engine coolant hose can be cut and the hose ends coupled to these openings. The engine heater is thereby a part of the engine cooling circuit, and the coolant flowing through the beholder is heated by the heating element and circulated in the engine's cooling circuit. An engine heater of this type is often referred to as a "hose heater".

EP 2 462 339 A1 describes electrical heating device for heating a liquid in a vehicle, comprising a container and a heating plate, where the fluid in the container flows past the heating plate and where the heating plate is connected to an energy source via electrical wires. The heating plate contains a number of PTC elements ("Positive Temperature Coefficient") and the container is produced from a thermoplastic material.

U.S. Pat. No. 5,408,960 describes a heating device with a container with an electrical, thermostat-controlled, heating element and a pump which drives the coolant in the cooling circuit. The container has connection stubs for coolant inlet and outlet.

EP 1 375 997 B1 describes a heating device for a fluid pipe, particularly for heating gases ventilated from a crankcase in a combustion engine, with a heating element and a holder for the heating element. The holder has a protrusion which is arranged for receiving the heating element and is shaped to be pushed into a shaft in the fluid pipe. The shaft has a wall which borders on the inside of the fluid pipe. It is also described that the heating element affects the outer wall of the fluid pipe.

There is a need for a heating device which is more compact, easier to produce and assemble, and also is more efficient than the known heating devices.

SUMMARY OF THE INVENTION

The invention is set forth and characterized in the main claim, while the dependent claims describe other characteristics of the invention.

It is thus provided a heating device for heating of a fluid, particularly in a vehicle or vessel, comprising at least one heating element in a housing with a housing wall and a fluid inlet and a fluid outlet; characterized in that the fluid inlet and fluid outlet are connected via at least two fluid channels separated by at least one wall and wherein the wall or a part of this or a part of the house wall is a heat conductor for conducting heat between the heating element and at least one of the fluid channels.

In one embodiment, the heating device comprises at least one chamber which is defined by at least a portion of the at least one wall and by a portion of the housing wall and in which said heating element may be assembled.

In one embodiment, the fluid channels are separated by walls which in pairs forms a chamber between themselves, in which the heating element may be assembled.

The chamber has an opening towards the outside of the housing and the opening is not fluid connected to the fluid channels. In one embodiment, the heating device comprises support profiles which are connected to respective walls and extending a portion into each respective fluid channels.

In one embodiment, the heating device comprises support profiles which extends between respective walls and an opposite portion on the inside of the housing wall such that part-fluid-channels are formed in each fluid channel. The bottom portion of the chamber is in the opposite end of the opening of the chamber and is recessed in the housing wall.

The heating device comprises preferably a cover which via fixating means may be assembled releasably to a holding device on the housing and also a carries a socket for connection to an electric power source for the heating device, and the cover and the holding device forms a junction room for wires coupled to the heating device. The opening of the chamber opens into the housing holding device. The heating element is preferably a PTC element, and is releasably fixed in the chamber by means of one or more clamping devices.

In one embodiment, a membrane is placed between the holding device and the cover.

In one embodiment, the opening of the chamber is larger than the bottom portion of the chamber.

In one embodiment, the heating device further comprises connection devices which are releasably connected respective fluid openings.

The material of the housing is heat conductive, and in one embodiment, the housing, including its walls and chambers, is one integrated element. The material of the housing is in one embodiment a metal, such as aluminium or titanium.

In one embodiment, the fluid inlet and the fluid outlet are arranged along the same axis. The contact is arranged along the same axis as the fluid inlet and fluid outlet. In one embodiment, at least one of the chambers extends through the housing longitudinal axis.

In one embodiment, the housing has a substantially circular cross section and the housing longitudinal axis of the extends through the centre of the circle, and at least one of the chambers extends through the centre of the circle.

In one embodiment, the heating device comprises a room arranged for thermal contact with at least one of the channels, and a thermostat or a temperature limiter is arranged in the room and connected to the heating element.

It is also provided a heating device for heating a fluid, particularly in a vehicle or vessel, characterized by at least one heating element arranged in a housing with a fluid inlet and a fluid outlet interconnected via one or more fluid channels; said heating element being thermally connected to the fluid channel; a thermostat connected to the heating element and arranged to break the power supply to the heating element if the temperature sensed by the thermostat exceeds a predetermined value, and to resume said power supply when the sensed temperature drops below a predetermined temperature. In one embodiment, the heating element is a PTC element.

BRIEF DESCRIPTION OF THE DRAWINGS

The above mentioned and other characteristics of the invention will become clear from the following description of preferential embodiments, given as non-restrictive examples, with reference to the attached drawings, wherein:

FIG. 1 is a perspective drawing of an embodiment of the heating device according to the invention;

FIG. 2 is a perspective drawing of the heating device shown in FIG. 1, seen mainly from one end;

FIG. 3 is a perspective drawing of a section in plane A in FIG. 1;

FIG. 4 is a perspective drawing of an embodiment of the heating device housing;

FIG. 5 is a drawing of a cross section in plane B in FIG. 4, seen from an end;

FIG. 6 is a perspective drawing of the heating device shown in FIG. 1, fitted with releasable connection stubs;

FIG. 7 shows a section through the heating device housing, as in FIG. 5, but shows in addition a PTC element and two locking wedges placed in the chamber;

FIG. 8 shows a vertical section along the longitudinal axis C in FIG. 6;

FIG. 9 corresponds to FIG. 8, except that the vertical section is placed somewhat to the side of the longitudinal axis C in FIG. 6, inter alia to show connection devices for the heating element;

FIG. 10 is an enlargement of region D in FIG. 8, seen from a different perspective;

FIG. 11 is a section of a second embodiment of the heating device according to the invention;

FIG. 12 is a perspective drawing which shows a vertical section of the embodiment shown in FIG. 11, where the section is somewhat to the side of the longitudinal axis;

FIG. 13 is a section of a third embodiment of the heating device according to the invention;

FIG. 14 is a perspective drawing which shows a horizontal section of the embodiment shown in FIG. 13, seen from below;

DETAILED DESCRIPTION OF PREFERENTIAL EMBODIMENTS

Figure 15:
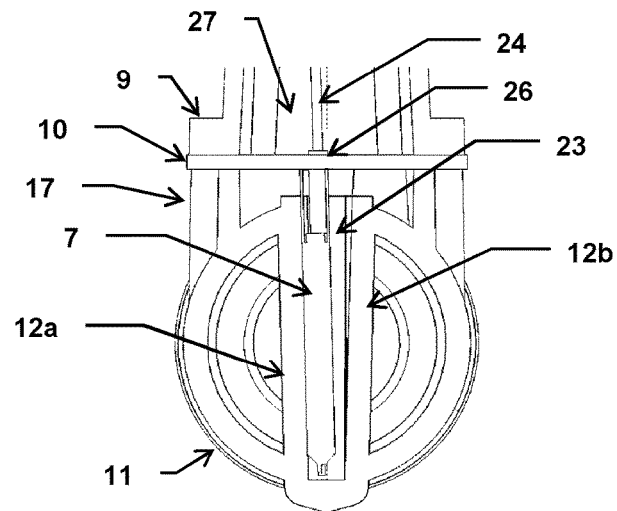
FIG. 15 shows a section through the heating device housing, as in FIG. 5, but shows in addition a PTC element and one locking wedge placed within the chamber, and also wires through the membrane between the housing base and the cover flange.

In this description, terms such as "upper", "lower", "inner", "outer", "vertical", "horizontal", "forward", "rear", etc. exist. The terms are used with reference to the device according to the invention, as it appears in the figures.

FIG. 1 shows a first embodiment of the heating device according to the invention. A generally tube-shaped housing 1 has a first fluid opening 4a and a second fluid opening 4b and internal channels which allow fluid flow between the fluid openings. Each of the fluid openings can be connected to respective hoses (not shown), such that the heating device is an integral part of for example a coolant circuit in a combustion engine. It should be understood that fluid can flow in either one direction or the other through the housing. Which one of the fluid openings 4a,b that is respectively the inlet opening and the outlet opening therefore depends on the current application of the heating device and is not important for the invention as such.

The housing 1 has a basically circular cross section, and has a base 17 to which a cover 2 is attached, in a per se known way, e.g. by means of screws 8 through a flange 9 on the cover. The figure also shows a sealing membrane 10 between the flange 9 and the base 17. In the cover, there is also a socket 3 for connection with electrical wires 24 in a junction room 27 (see FIG. 9). The socket 3 is arranged along the housing longitudinal axis, which is advantageous from an installation and user perspective.

FIG. 2 and FIG. 3 show that in the housing, between the fluid openings 4a,b, there are two separate fluid channels 6a,b. Each fluid channel 6a,b is defined by a respective internal portion of the wall 11 of the housing (which in the illustrated embodiment is circular) and a respective internal partition wall 12a,b which in the illustrated embodiment extends between an upper portion in the housing and a lower portion in the housing. Between the partition walls 12a,b is a chamber 13 (see also FIG. 4 and FIG. 5). The partition walls are connected at the front and rear by respective end walls 5a,b (see i.a. FIG. 2 and FIG. 4). The end walls 5a,b are preferably rounded or streamlined in order to reduce fluid drag and subsequent loss of pressure when fluid flows through the housing.

The chamber 13 is thus defined by the partition walls 12a,b and end walls 5a,b, and a bottom portion 14. The bottom portion 14 is in the illustrated embodiment somewhat recessed (inlaid) in relation to the inside of the wall 11 of the housing, and is finished in a structure enhancing elevation 15 protruding outside a portion of the outside of the wall 11 of the housing (see particularly FIG. 3 and FIG. 5). This contributes to a good heat transfer between the chamber and the housing wall 11, and increases thus the heating efficiency of the fluid flowing through the housing.

The chamber 13 has in an upper end a chamber opening 16, see e.g. FIG. 4 and FIG. 5. In the illustrated embodiment (FIG. 5) the chamber is somewhat narrower in the bottom portion 14 than up at the opening 16. This in order to arrange for assembling and fixating of heating elements by means of wedge-shaped plates, as described below with reference to FIG. 7.

FIG. 6 shows the heating device as illustrated in FIG. 1, but here with attached detachable and interchangeable connection pipes, or stubs, 18a,b. The connection stubs have respective flanges 19a,b at their free ends, which can be connected to the hoses of the cooling system. An advantage with such replaceable connection stubs is that the free ends can be made such that they fit different hose connections (i.e. the flanges 19 can be replaced by other geometries or connection mechanisms). The same heating device can thus be used together with different hose systems, e.g. with manufacturer-specific dimensions and/or connections. As also shown in FIG. 7, the connection stubs 18a,b have an internal channel 29a,b such that a fluid channel connection is formed with the abovementioned fluid openings 4a,b. The connection stubs are preferably made of a thermally insulating material, such as a thermoplastic material (e.g. PPS or PPA).

FIG. 10 shows how the connection stub 18a is mounted to the housing 1. In the illustrated embodiment, the connection stub has a circular flange 22 and an O-ring 21 placed in a groove on the stub. The O-ring seals against the internal wall of the fluid opening 4a and a locking ring 20a holds the connection stub in place in the axial direction. The connection stub is thereby rotatably connected to the housing.

With reference now to FIG. 7, the chamber 13 is configured for receiving a so-called PTC element 7. PTC elements ("Positive Temperature Coefficient") are as such well known and need therefore not be described in detail here. It should be mentioned that a PTC element is a semiconductor whose internal electrical resistance increases rapidly (has a steep, positive gradient) with increasing temperature after the temperature has passed a reference value which is specific for the element. A PTC element is therefore self-regulating in the sense it cannot overheat: when the temperature in the PTC element exceeds the reference temperature, the electric resistance also increases and the energy supply decreases. When the temperature decreases, the resistance is lowered such that the current through the element increases.

In the embodiment illustrated in FIG. 7, the housing holds one PTC element 7, but the invention is not limited to this number. It should also be understood that the invention is also not limited to heating elements only of type PTC, even if the illustrated embodiment shows this. The chamber can consequently be shaped in order to make room to more heating elements and/or heating elements with different shapes than the figure shows.

As shown in FIG. 7, the PTC element 4 is fixated in the chamber by means of two wedge-shaped press plates 23. The press plates also provide for good heat conductivity between the PTC element and the partition walls 12a,b. Preferably, a sliding plate is arranged between the press plates and PTC element in order to protect the PTC element, but the figure does not show such sliding plate. During assembly, the PTC element and the sliding plate are first introduced down in the chamber, before the wedge-shaped press plates are pressed in between the respective partition walls and the PTC element. By doing so, damage to the PTC element is prevented. Both the press plates 23 and the housing 1 (including the partition walls) are made of a material with good heating conductivity. A well suited material is aluminium.

As the housing is made of a material with good heat conductivity, it can be convenient to externally insulate the housing, both to reduce energy loss to the environment around the heating device and to reduce risk of injury to people coming in contact with it. It can therefore be imagined an outer, heat-insulating casing (not shown) which entirely or partly surrounds the heating device.

FIG. 8 shows the heating device with the PTC element 7 installed in the chamber 13 (The press plates described above with reference to FIG. 7 is not shown in FIG. 8). FIG. 9 corresponds to FIG. 8, except that the vertical section is placed somewhat to the side of the longitudinal axis C in FIG. 6, in order to among others show how the PTC element is connected to the socket 3 via wires 24 through an opening 26 in the membrane 10. The FIGS. 8 and 9 show also the junction room 27, where the wires 24 are connected to the socket 3 before the cover 2 is attached to the housing base 17.

FIG. 15 shows another embodiment of the assembly of the PTC element in the chamber. Here, the PTC element 7 is placed against the partition wall 12a and only one wedge 23 is utilised, placed between the PTC element and the other partition wall 12b. FIG. 15 also shows how the PTC element is connected to the wire 24 which is pulled through the opening 26 in the membrane 10 and up into the junction room 27.

Figure 16:
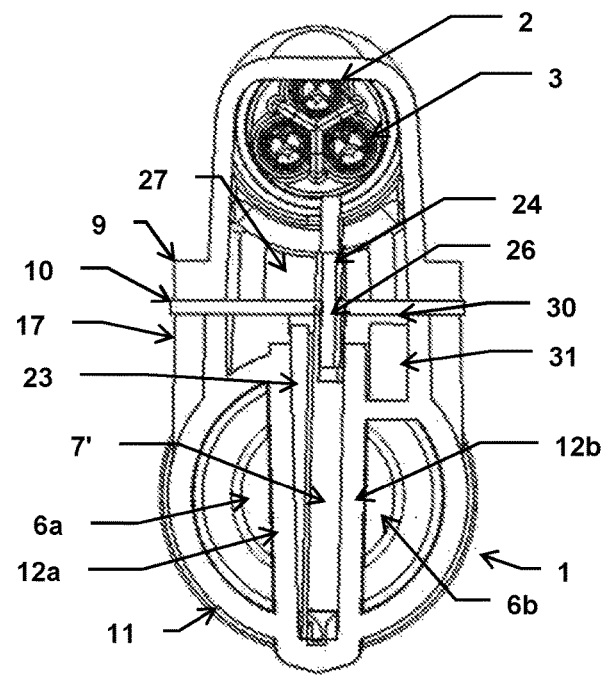
FIG. 16 shows a section through another variant of the heating device housing, and shows inter alia a room in the housing for a thermostat and possibly a temperature limiter.

FIG. 16 shows another embodiment of the invention where the housing 1 holds a room 30 with in which a thermostat 31 is arranged. The lower wall of the room forms an upper wall in the channel 6b. The thermostat 31 is coupled to the heating element 7' (wires not shown) and is arranged in a per se known way to cut the power supply to the heating element if the thermostat is exposed to (i.e. senses) a given (predetermined) temperature. If the heating element 7' is a PTC element, this is self-regulating and a thermostat is per se not needed regarding the PTC element and to avoid unwanted heating of this. But the thermostat can be advantageous for several reasons, such as e.g. energy conservation and protection of personnel (e.g. during service, disassembly) and provides extra safety against overheating of the heating device as such (and thus the coolant). The heating element 7' is shown assembled with a wedge 23 as described above, but the assembly shall not be limited to such variant.

The room 30 and thermostat 31 also provide for the heating element 7' being a conventional heating element (with an internal resistance), which is controlled by the thermostat. Even if it is not shown in the figures, it should be understood that a per se known temperature limiter can be placed in the junction room 27 or in the room 31 and be connected to the heating device and/or thermostat.

Figure 17:
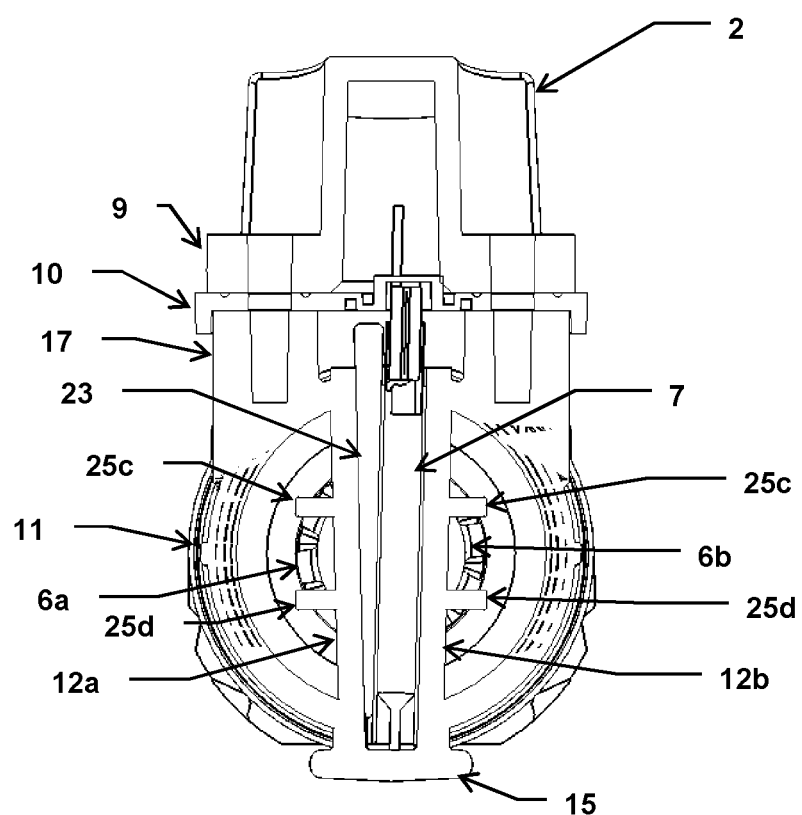
FIG. 17 shows yet another variant of the invented heating device.

When the heating element is installed in the chamber 13 in one of the ways described above, the walls (i.e. the partition walls 12a,b) of the chamber are exposed for a significant load due to the wedge-shaped press plates 23. Such loads can naturally be compensated for by increasing the thickness of the wall, but this is not always desirable or appropriate. FIG. 11 and FIG. 12 shows an embodiment of the heating device where the housing 1 is provided with support ribs 25a,b which extends between respective partition walls 12a,b and an opposite portion of the inside of the wall 11. The support ribs serve to transmit forces between the partition walls 12a,b and the housing wall 1, and relieves thereby the partition walls. FIG. 12 shows a variant of the support rib 25b which extends a relatively small amount in the axial direction of the heating device; a greater axial extension, e.g. along the entire partition wall 12b, can under some conditions be favourable. FIG. 17 shows yet another variant, where support ribs 25c,d are arranged in pairs on each respective partition wall 12a,b, and extend only a portion into each respective channel 6a,b, and thus not abutting against the housing wall.

As shown in FIG. 11, the support ribs 25a,b divides its respective channels 6a,b into respective part-channels 6a', 6a" and 6b', 6b". The support ribs 25a,b can advantageously be shaped from a heat conducting material (as the partition walls and the housing in general), which increases the heat transfer from the PTC element and into the fluid (e.g. coolant) which flows through the housing when the heating device is in use.

FIG. 13 and FIG. 14 show yet an embodiment of the heating device, where the housing has two chambers 13a,b (respective end walls 5a,b shown in FIG. 13) placed next to each other a distance apart such that an intermediate channel 6e is formed and a channel 6c, 6d on each side of the chambers. The construction of these chambers and the mounting of PTC elements is as described above with reference to the chamber 13, and need not be repeated here. The two chambers 13a,b placed in parallel form three fluid channels 6c, 6d, 6e, which improves the heat transfer from the chambers to the fluid (e.g. coolant) which flows through the channels when the heating device is in use.

In all variants and embodiments of the heating device which are described above, the housing 1 is preferably moulded in one piece. However, the invention is not limited to such production process. The entire housing, or at least the chambers 13, 13a,b (i.e. the partition walls 12a,b) and the wall 11 of the housing, and preferably also the support ribs 25a,b, are made in a heat conducting material, such as aluminium or titanium.

It should also be understood that other chamber configurations than those described above are possible, e.g. after each other along the longitudinal axis of the housing. It can also be imagined that other heat sources than PTC elements can be placed in the chamber or chambers.

An advantage with the heating device according to the invention is that the heating device can be replaced without the cooling circuit which the heating device is a part of has to be opened. When the flange 9 is released from the base 17, easy access is provided to the heating elements (e.g. the PTC element) which are installed in the chamber 13 and these can be replaced without the need of disassembling the housing from the fluid hoses to which it is attached.

The separate channels and part-channels of the housing, which are defined by through-going walls and (possibly) support ribs 25a,b contribute to a structural reinforcement of the housing and an increased heat transfer between chamber and fluid.

Even though the invention is described with reference to an engine heater for a coolant in a combustion engine, it should be understood that it could be utilized for assembly on other units, particularly vehicles or vessels, and for fluids (gasses and/or fluids) other than a coolant.

The invention claimed is:

1. A heating device for heating a fluid, particularly in a vehicle or vessel, comprising:
    a housing having a housing wall, a fluid inlet, and a fluid outlet, the fluid inlet and the fluid outlet connected via at least two fluid channels, wherein:
        the fluid channels are separated by a chamber defined by at least two walls, at least two end walls, and a bottom portion, the chamber having an opening towards the housing outside and at least one heating element received therein,
        the walls comprise a heat conducting material, and
        the bottom portion of the chamber is recessed into an inside of the housing wall.

2. The heating device of claim 1, further comprising support profiles which are connected to respective walls and extending a portion into each respective fluid channels, thereby contributing to a structural reinforcement of the housing and an increased heat transfer between the chamber and the fluid.

3. The heating device of claim 1, further comprising support profiles which extend between respective walls and an opposite portion on the inside of the housing wall such that part-fluid-channels are formed in each fluid channel.

4. The heating device of claim 1, wherein the housing, including the walls and chambers, is one integrated element.

5. The heating device of claim 1, further comprising a cover which via a fixating member is releasably assembled to a holding device on the housing and also carries a socket for connection to an electric power source for the heating device, and the cover and the holding device form a junction room for wires coupled to the heating device.

6. The heating device of claim 5, wherein the opening of the chamber opens into the housing holding device.

7. The heating device of claim 5, further comprising a membrane between the holding device and the cover.

8. The heating device of claim 5, wherein the socket is arranged along the same axis as the fluid inlet and fluid outlet.

9. The heating device of claim 1, wherein the heating element is a PTC element.

10. The heating device of claim 1, wherein the heating element is releasably fixed in the chamber by means of one or more clamping devices.

11. The heating device of claim 1, wherein the opening of the chamber is larger than the bottom portion of the chamber.

12. The heating device of claim 1, further comprising connection devices which are releasably connected to the respective fluid inlet and fluid outlet.

13. The heating device of claim 1, wherein the housing comprises a heat conductive material.

14. The heating device of claim 1, wherein the housing comprises a metal material, such as aluminium or titanium.

15. The heating device of claim 1, wherein the fluid inlet and the fluid outlet are arranged along the same axis.

16. The heating device of claim 1, wherein at least one of the chambers extends through the housing longitudinal axis.

17. The heating device of claim 1, wherein the housing has a substantially circular cross section and the longitudinal axis of the housing extends through the centre of the circle, and at least one of the chambers extends through the centre of the circle.

18. The heating device of claim 1, further comprising a room arranged for thermal contact with at least one of the channels, and a thermostat or a temperature limiter is arranged in the room and connected to the heating element.

19. The heating device of claim 1, in which the heating element is thermally connected to the fluid channel, wherein
    a thermostat is connected to the heating element and arranged to break the power supply to the heating element if the temperature sensed by the thermostat exceeds a predetermined value, and to resume said power supply when the sensed temperature drops below a predetermined temperature.

20. The heating device of claim 19, wherein the heating element is a PTC element.

* * * * *